W. A. LANDIS & L. A. COSTA.
EGG TRANSFER AND TESTING DEVICE.
APPLICATION FILED APR. 4, 1910.
978,601.
Patented Dec. 13, 1910.
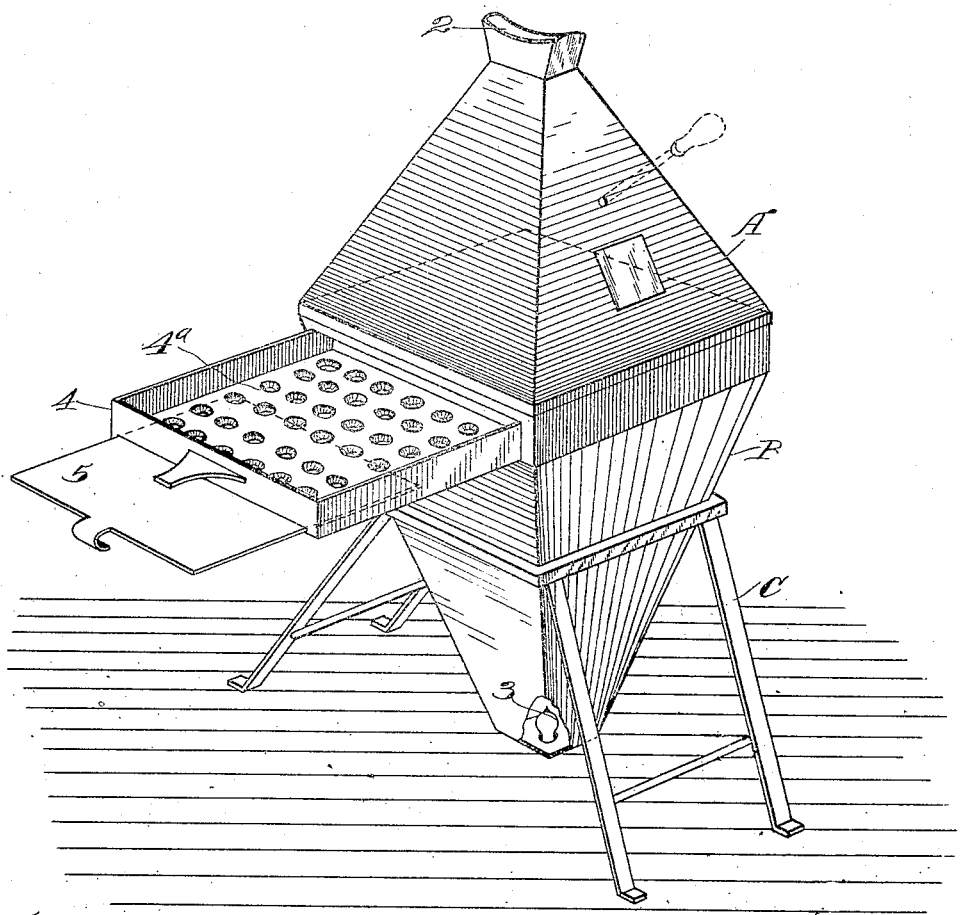
Fig. 1.
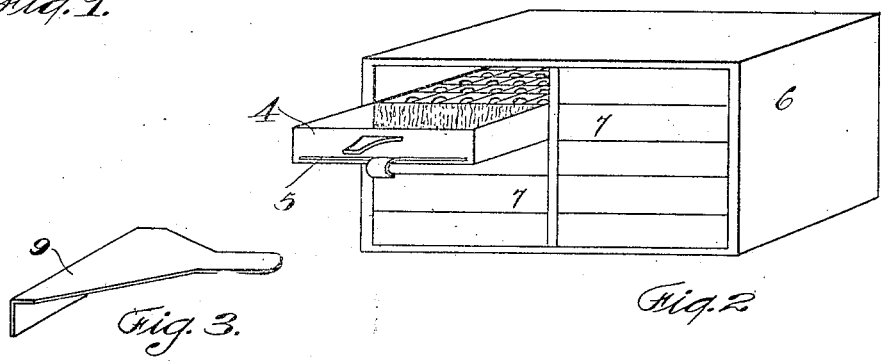
Fig. 3.
Fig. 2.
Witnesses,
F. E. Maynard
D. Castberg
Inventors,
William A. Landis
and Louis A. Costa,
By G. H. Strong.
his Atty.

UNITED STATES PATENT OFFICE.

WILLIAM A. LANDIS AND LOUIS A. COSTA, OF GLEN ELLEN, CALIFORNIA.

EGG TRANSFER AND TESTING DEVICE.

978,601.

Specification of Letters Patent. Patented Dec. 13, 1910.

Application filed April 4, 1910. Serial No. 553,214.

*To all whom it may concern:*

Be it known that we, WILLIAM A. LANDIS and LOUIS A. COSTA, citizens of the United States, residing at Glen Ellen, in the county of Sonoma and State of California, have invented new and useful Improvements in Egg Transfer and Testing Devices, of which the following is a specification.

Our invention relates to a device for conveniently and rapidly testing eggs and transferring them from the cases to the testing apparatus, and re-transferring them back to the cases after testing has been completed.

It also comprises the combination of parts and details of construction, which will be more fully explained by reference to the accompanying drawings, in which—

Figure 1 is a perspective view of our apparatus. Fig. 2 is a view of an egg case, and means for removing the tray. Fig. 3 shows the manner of transferring the eggs to the testing tray.

Eggs are usually sent to market in cases in which nests of removable trays containing the eggs in separate compartments are placed, and my invention is designed to transfer these eggs from the compartments in such quantities as may be therein contained, to the testing machine wherein they are rapidly tested, and by the same means are returned again to the transporting trays and cases.

Our testing apparatus consists of a double coned chamber, composed of two parts A and B, which converge upwardly and downwardly respectively. This apparatus may be conveniently held upon supporting legs, as shown at C, and the upper part is adapted to fit over the lower portion and be readily removed therefrom, the point of junction being preferably where the larger diameters of the parts A and B meet. We have shown these parts as rectangular in form. At the upper end of the part A is an eye-piece 2 conveniently constructed so that the face of the operator will fit against the edges of the eye-piece, and light be shut out, the eyes being in line to look downwardly through the apparatus. The lower end of the lower part B is open, and may be sufficiently lighted in any suitable manner. An incandescent electric light, as at 3, is a very convenient method of lighting, and will throw a sufficiently intense light to the interior of the testing chamber.

4 is a tray having low vertical sides and front, and the bottom of which has perforations made in it as shown at 4ª, to hold any suitable or desired number of eggs, as three dozen, which is the usual number contained in the trays of egg-transporting cases. These holes allow the light from below to pass through, and when eggs are placed in the holes, the light transmitted through the eggs will indicate to the observer whether the eggs are in good condition or not. An opening may be conveniently made in the side of the upper part A of the chamber through which the observer can introduce his hand, and with a pencil mark any eggs which are of doubtful character.

5 is a plate which may be termed a curtain. This plate has an area equal to that of the tray 4, and is slidable into the tray so that when in place it cuts off all the light from below. By gradually withdrawing this plate or curtain, the rows of egg-containing openings may be exposed in lines, so that the eggs in the rearmost row may be inspected, then the next row, and so on throughout the whole list, thus insuring accuracy of the work.

The eggs are usually delivered in cases such as shown at 6. These cases contain fillers or drawers 7, usually provided with transverse partitions so that each egg occupies a compartment by itself. For the purpose of our invention it is preferably to remove the side of the case, thus exposing the drawers or fillers 7. The superposed fillers are separated from each other in the cases 6 by horizontal pasteboard or equivalent partitions or diaphragms.

The operation of transferring the eggs from the case to the testing device is as follows: The sides of the tray 4 are sufficiently separated to pass outside of the filler, while the bottom of the tray, with the curtain plate in place, slides between the eggs and the horizontal partition. The filler with its contained eggs then rests in the tray, and may be transferred bodily into the testing apparatus, then by withdrawing the curtain as previously explained, the light may be allowed to pass through the eggs for testing purposes. The eggs having been introduced and tested or "candled," as it is technically termed, the curtain may be returned to its place and the testing tray is removed, with the partition drawer or filler in it, so that the filler may be returned to its place in the case. When the tray is withdrawn, after the filler has been returned to the case, the eggs and filler are held in place by a hoe-shaped device 9 which is introduced into the tray outside the eggs. Any defective eggs, if such occur, may be removed previous to this operation, and their places filled with other good ones.

The apparatus enables us to rapidly and accurately carry on the process of testing the eggs, and without handling.

This apparatus may be operated without the use of a dark room.

Having thus described our invention, what we claim and desire to secure by Letters Patent is—

1. The combination in an egg-testing apparatus, of upwardly and downwardly convergent separable members forming a closed case having observation and light openings at top and bottom, and a perforated testing tray slidable transversely of the apparatus and having an open inner end and sides to inclose the filler sides, said tray constituting a means for transferring the egg-containing compartment drawers or fillers to and from the apparatus, and a curtain plate slidable in said tray.

2. The combination in an egg-testing apparatus, of upwardly and downwardly convergent separable members forming a closed case having observation and light openings at top and bottom, and a perforated open ended testing tray slidable transversely of the apparatus to inclose the sides and bottom of the filler, said tray constituting a means for transferring the egg-containing compartment drawers or filler to and from the apparatus, a curtain-plate slidable in said tray, and a plate fitting the tray front to retain the eggs in the case when the tray is to be withdrawn.

3. A transfer device for egg testing, said device including a tray having an open inner end, a bottom having openings to register with the filler compartments of the carrier, said tray sides inclosing the filler sides and the bottom passing beneath the filler, and a curtain plate slidable below the tray bottom to control the exposure of the eggs within the testing apparatus.

In testimony whereof we have hereunto set our hands in the presence of two subscribing witnesses.

WILLIAM A. LANDIS.
LOUIS A. COSTA.

Witnesses:
H. C. LAFFERTY,
A. VALLE.